May 26, 1936.  W. M. SHULTZ  2,042,076
BLANKET FOR PRINTING PRESSES
Filed April 26, 1932

Inventor
William M. Shultz
by J. Daniel Stuwe
Attorney.

Patented May 26, 1936

2,042,076

UNITED STATES PATENT OFFICE 2,042,076

BLANKET FOR PRINTING PRESSES

William M. Shultz, Eureka, Kans.

Application April 26, 1932, Serial No. 607,582

4 Claims. (Cl. 154—54.5)

This invention relates to a new and improved blanket for printing presses.

One of the main objects of this invention is to provide an efficient and "live" packing or foundation blanket which is used for packing the impression beds of printing presses and the like, and which has various layers combined into a single blanket.

Another object is to provide such a foundation blanket or packing which is of less thickness than the packing space permitted on the printing press to which it may be applied, whereby to allow for the use of a thin top draw sheet of the nature best suited to the requirements of the press and the quality of work produced.

These and various other objects and advantages will become apparent from the following description, taken in connection with the accompanying drawing, in which the invention is illustrated in its preferred forms of construction, it being understood that various other arrangements and forms of construction may be resorted to for carrying out the objects and purposes of this invention.

The present methods of packing printing presses are confined to the use of a plurality of layers of either paper, cloth, cork or rubber, each element being separate from the other and being independently anchored or set as a part of the packing of the printing press.

These various elements in the packing have varying tensile strength and are differently affected by the wear and strain of the elements due to the rapid revolving of the cylinder to which they are attached. On presses which permit considerable packing a felt blanket of several layers is in common use, but these layers of felt develop a rub or chafe between the several layers which soon results in a consequent lessening in the thickness and utility of the blanket. Such condition also occurs with a blanket of several separate layers of cork or rubber, and when thus used upon the cylinder of the press friction and heat is caused in the several layers which will greatly lessen their efficiency and intended mission.

It is to overcome these objections, and to supply a highly efficient foundation blanket or packing for printing presses, one which will serve all purposes, that I have developed this invention.

I have found by experiment that the use of cork as a foundation is superior to that of felt, for the reason that it does not possess the "sink" or "set" from service, as it is more firm and of greater resiliency; whereas rubber is recognized for its great resiliency and quick response to the variations in the printing form. However, the use of two or more of these elements, when used as separate superposed layers, has a tendency to nullify much of the usefulness and efficiency of either one alone; while cork blankets which are now in use are made with a binder of oxidized linseed oil or like ingredients, which makes the combining of cork with a resilient rubber impossible without the binder ingredients having a deteriorating effect upon the rubber.

Figure 2:
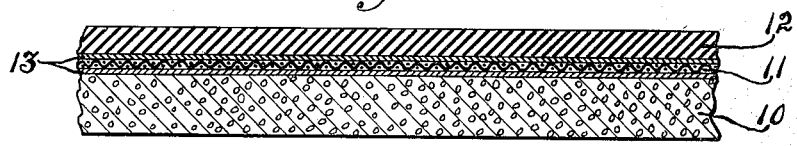
Fig. 2 is a fragmentary sectional view thereof on an enlarged scale.

In my invention I combine both cork and rubber into a single unit or unitary blanket, in such a manner that the best results will be obtained in the most practical and economical way. For that purpose I use a finely granulated cork mixed with a resinous or similar binder of a non-mineral nature, so that it has an affinity for rubber, the mixture being rolled and pressed by ordinary methods of cork manufacture, providing a cork composition 10 in a sheet form. This sheet or layer of cork composition of a suitable size has a layer or sheet of fabric 11 laid thereon which is of a non-stretching nature, and on this sheet of fabric, opposite to the layer of cork is laid a layer 12 of rubber which consists of one or more superposed sheets or layers of rubber. Cementitious or adhesive means 13 is preferably also placed between said layers 10, 11 and 12, as indicated in Fig. 2. This blanket of combined layers is then rolled, pressed and vulcanized to a degree best suitable to the life and resiliency of the rubber. By this rolling and heating of these combined layers a firmness is imparted to the layer of cork composition in this unitary blanket that is not possible in the production of a blanket of the cork composition alone.

Figure 1:
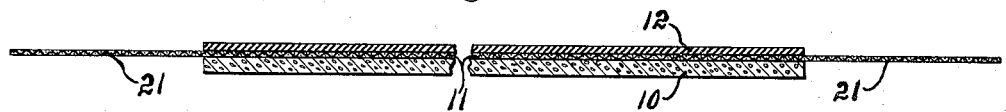
Fig. 1 is a sectional view of a printer's blanket embodying my invention.

The layer of fabric 11, which is interposed between the layers of cork and rubber of my blanket, may be utilized to provide a hanger or extending means for anchoring the blanket to the press, and I therefore preferably extend the ends of the layer of fabric beyond the layers of cork and rubber, so as to provide integral end flaps or extensions 21 on the blanket. This may be readily done by cutting away both the layers of cork and rubber, as shown in Fig. 1, providing the end extensions or flaps, to permit hooking or applying of one end of the blanket to the clamps of the press and drawing the blanket to a taut position at the other end, as is well known in this art.

Figure 3:
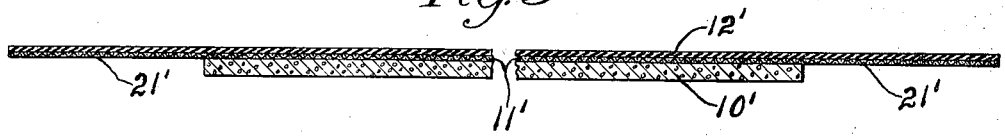
Fig. 3 is a sectional view of a modified form of this invention.
Figure 4:
Fig. 4 is a fragmentary view thereof on an enlarged scale.

In the form shown in Figs. 3 and 4 the end extensions or flaps 21' are provided by cutting away or omitting the layer 10' of cork composition at the ends of the sheet, thereby extending the ends of the layers 11' and 12' of fabric and of rubber. Cementitious material 13' may be used for attaching the layers 10' and 11' together before the rolling and vulcanizing process takes place. In this form the layer of rubber is preferably somewhat thinner than in the preceding form, so as to provide a flexible end flap for hooking to the clamp of the press.

It will be apparent that the advantages of my combination blanket over present blankets and the methods of making them lies in the use of a cork base or bottom, which is more resilient and less subject to the harmful effects from oils and elements than that of felt, and in the use of a top layer or sheet of resilient rubber, which possesses more "life" or "pep" and provides a quicker response to inequalities of printing forms, than either cork, felt or other substances. The intimately combined elements in my improved blanket possess the desirable qualities of a unitary or single piece packing which is devoid of the objectionable features of two or more blankets of the same or of different material, as stated above.

This improved blanket is intended and is used solely as a foundation packing or blanket, and is made of less thickness than the packing space permitted on the printing press to which it is adapted to be applied, thereby allowing for the addition of a thin top draw sheet of a material best suited to the requirements of the particular press and quality of work produced. Such top sheet may have an ink-resisting or other suitable top facing, common to the industry, and as such thin sheet is subject to severe usage and requires frequent changing, but as it is of small cost, this invention provides for economy, by the use of my combination blanket or foundation packing which is of less than the full thickness generally used heretofore. My blanket being of less than packing depth in thickness, also permits any under-lay or make-ready that might be required, and the same may be accomplished without loosening or resetting the blanket to its permanent anchorage as a foundation.

While I have found that the several layers combined as a unit, with the cork layer as the base and the rubber layer as the top, substantially in the manner disclosed above, will produce the most efficient results; I have also found that by using a layer of cork as the foundation or base layer and using the layer of resilient rubber thereover as a blanket, even when used as individual layers which have not been integrally united, results are obtained which are greatly superior to the use of the present blankets having either felt or rubber as a foundation.

I claim:

1. A packing blanket for the impression cylinders of printing presses, consisting of a base layer of granulated fibrous composition which is substantially equal to and limited to the printing surface of the circumference of the cylinder, an upper layer of fabric and rubber upon the fibrous layer being thinner than the latter and extending beyond the same to provide for anchorage and avoid creating any hump at the edge of the cylinder, and adhesive means connecting said layers together, all of which has been cured and vulcanized and constitutes a single unit.

2. A packing blanket for the impression cylinder of printing presses, consisting of a layer of granulated cork composition which provides the major thickness and the under portion of the blanket and is equal to and confined to the printing surface of the circumference of the cylinder, a layer of fabric sheeting upon the cork layer, being of greater length than the latter to provide for anchorage, a surfacing layer of rubber upon said fabric sheeting and being of greater length than said layer of cork, and adhesive means connecting said layers, all having been vulcanized and constituting an integral unitary blanket.

3. A packing blanket for the impression cylinder of printing presses, consisting of a base layer of granulated cork composition which is substantially equal in length to and limited to the printing surface of the circumference of the cylinder and provides the major thickness of the blanket, a layer of fabric sheeting upon the cork layer, being of greater length than the latter to provide for anchorage to the cylinder and being of proper tensile strength to prevent excessive stretching, a layer of resilient material upon the fabric layer to provide a live surfacing for the blanket and being substantially of the length of said fabric sheeting, and adhesive means connecting the layers, all having been vulcanized and constituting an integral unitary blanket, the combined upper layers of fabric and resilient material being thinner than said lower layer to provide for mounting the blanket on the cylinder without creating any hump at its edge.

4. A blanketing for the impression cylinders of printing presses, comprising a layer of fibrous substance which is limited to the printing circumference of the cylinder adapted to be mounted adjacent thereto, and a portion thereon including end parts extending beyond such printing circumference to provide for anchorage to said cylinder, all of which elements are combined to form a single unitary blanketing for such cylinder and free from hump or bolster at terminal edges of the cylinder.

WILLIAM M. SHULTZ.